No. 729,079. PATENTED MAY 26, 1903.
H. W. MEYERS.
STEERING WHEEL FOR AUTOMOBILES.
APPLICATION FILED JAN. 30, 1903.
NO MODEL.
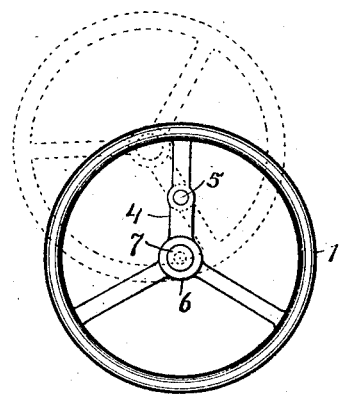
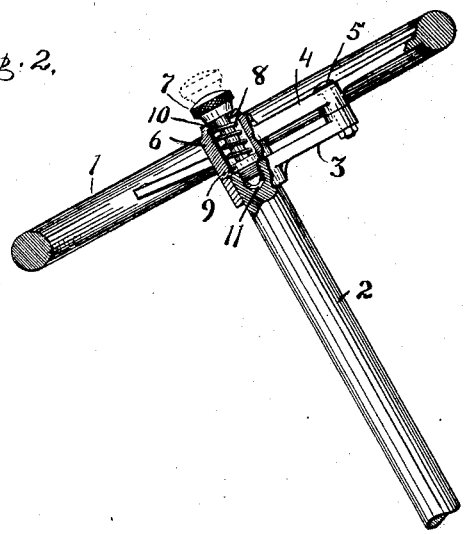
WITNESSES: Harry W. Meyers INVENTOR
BY W. J. Burns
ATTORNEY No. 729,079.

Patented May 26, 1903.

UNITED STATES PATENT OFFICE.

HARRY W. MEYERS, OF FORT WAYNE, INDIANA.

STEERING-WHEEL FOR AUTOMOBILES.

SPECIFICATION forming part of Letters Patent No. 729,079, dated May 26, 1903.

Application filed January 30, 1903. Serial No. 141,174. (No model.)

*To all whom it may concern:*

Be it known that I, HARRY W. MEYERS, a citizen of the United States, residing at Fort Wayne, in the county of Allen and State of Indiana, have invented certain new and useful Improvements in Steering-Wheels for Automobiles, of which the following is a specification.

This invention relates to improvements in steering apparatus for automobiles; and the object thereof is to afford a steering-wheel which can be shifted from its normal position, so as to facilitate ingress and regress to and from the driver's position in the vehicle.

I accomplish my object by the construction illustrated in the accompanying drawings, in which—

Figure 1 is a plan of the steering-wheel, showing in dotted outline the wheel shifted from its normal position; and Fig. 2 is a side elevation of the steering-wheel and steering-post, partly in section.

Similar numerals of reference indicate corresponding parts in both views, and referring now to the same, 1 is the steering-wheel, and 2 is the steering-post.

3 is a crank rigidly fixed at the top of the steering-post 2, and 5 is a bolt which extends from the outer end of the crank and ranges in a line parallel with the axis of the steering-post. The wheel 1 is engaged by said bolt at a point eccentric of the axial center of said wheel—as, for example, through one of its arms 4—and said wheel is adapted to be turned upon said bolt, and thereby moved to eccentric positions respecting the post without altering its diametrical plane. The hub 6 of the steering-wheel ranges in line with the axis of the steering-post when the said steering-wheel is in normal position. A set-screw 7 is rotatively mounted in the hub 6 and ranges in line with the axial center of the steering-wheel. The said hub is counterbored to receive the spring 8, which is interposed between the collar 9 on the lower part of the set-screw 7 and the shoulder 10 at the top of the hub 6. The lower end of the said set-screw, beneath the collar 10, is threaded and is adapted to engage in the screw-threaded socket 11 in the top of the steering-post 2.

In using this invention the set-screw 7 is turned until the lower end thereof becomes disengaged from the socket 11, and then by lifting said set-screw slightly, so as to compress the spring 8, the end of the said set-screw will thereby be lifted clear of the end of the steering-post. Then the steering-wheel may be turned upon the bolt 5, and thereby shifted laterally to an eccentric position respecting the steering-post, as indicated in dotted outline in Fig. 1 of the drawings. While the steering-wheel is in said eccentric position ingress and regress to and from the vehicle are not obstructed, as is the case where a fixed steering-wheel is employed.

It will be readily understood that the steering-wheel is to be shifted from its normal position only when the vehicle is at rest and is to be readjusted and secured in its normal position before the vehicle is put in motion.

Having described my invention, what I claim as new, and desire to secure by Letters Patent, is—

1. In steering apparatus for automobiles, a steering-post; a crank fixed at the top of the post; a steering-wheel pivoted eccentrically to the outer end of the crank, and being adapted to range with its axial center in line with axis of said post when in normal position; a bolt rotatively mounted in the hub of said wheel and having a threaded lower end suited to engage in the end of said post and thereby hold said wheel in normal position; and a spring to hold said bolt in lowermost position.

2. In steering apparatus for automobiles, a steering-post; a steering-wheel; a bolt ranging parallel with the axis of the steering-post and affording a pivotal connection between said wheel and post at a point eccentric of their centers, whereby said wheel is adapted to be shifted in its diametrical plane to positions eccentric of said post; and means to secure said wheel in normal position.

3. In steering apparatus for automobiles, a steering-post; a crank fixed at the top of the post; a steering-wheel; a bolt ranging parallel with the axis of the steering-post and connecting said wheel and crank at a point eccentric of said post and wheel; and means to secure said wheel in normal position.

In testimony whereof I affix my signature in presence of two witnesses.

HARRY W. MEYERS.

Witnesses:
M. J. BLITZ,
W. G. BURNS.